US005367438A

United States Patent [19]

Deslandres

[11] Patent Number: 5,367,438

[45] Date of Patent: Nov. 22, 1994

[54] HEADLAMP WITH IMPROVED VENTILATING MEANS, ESPECIALLY FOR A MOTOR VEHICLE

[75] Inventor: Antoine Deslandres, Boissy-St.-Leger, France

[73] Assignee: Valeo Vision, Bobigny Cedex, France

[21] Appl. No.: 18,107

[22] Filed: Feb. 17, 1993

[30] Foreign Application Priority Data

Feb. 17, 1992 [FR] France ................................ 92 01776

[51] Int. Cl.[5] ................................................ B60Q 1/04

[52] U.S. Cl. ........................................ 362/61; 362/294; 362/373

[58] Field of Search .................... 362/61, 80, 294, 345, 362/373

[56] References Cited

U.S. PATENT DOCUMENTS 5,003,446 3/1991 Nagengast et al. ................. 362/294

5,010,453 4/1991 Ketterman ....................... 362/294 X

FOREIGN PATENT DOCUMENTS 2629343 2/1989 France .

2237626 5/1991 United Kingdom .

*Primary Examiner*—Stephen F. Husar

*Attorney, Agent, or Firm*—Morgan & Finnegan

[57] ABSTRACT

A motor vehicle headlamp comprises a housing, having a cover glass defining, with the casing, an internal space of the headlamp in which the light source is mounted. The headlamp includes ventilating means for ventilating the internal space, this being associated with the housing. The ventilating means comprises two projecting portions of the housing, one projecting outwardly and one inwardly. Each projecting portion is closed at its free end by a cap. The outward projecting portion and its cap together define a first duct and a second duct, communicating with each other through a bend, while the inward projecting portion similarly defines a third duct and a fourth duct, again communicating with each other through a bend. The first and third ducts also communicate with each other, and the second and fourth ducts are open, respectively, downwardly to atmosphere and upwardly into the internal space of the headlamp.

8 Claims, 2 Drawing Sheets

HEADLAMP WITH IMPROVED VENTILATING MEANS, ESPECIALLY FOR A MOTOR VEHICLE

FIELD OF THE INVENTION

The present invention relates in general terms to the ventilation of headlamps for vehicles.

BACKGROUND OF THE INVENTION

An ongoing problem in the design of ventilating systems for the internal spaces of headlamps is that it is necessary to ensure that air which may contain humidity to a greater or lesser extent, and which may have penetrated into the headlamp, is able to be properly evacuated according to the differential pressures that may exist, while at the same time avoiding any penetration of foreign matter such as water, mud, etc. into the interior of the headlamp.

It is accordingly known to provide a headlamp housing with a system of chicanes, labyrinths or similar which enable air to flow while preventing penetration of foreign matter.

It is also quite conventional, as disclosed in particular in the specification of French published Patent Application FR2212794A, to locate the ventilation orifice in a part of the lamp which may for example be cylindrical, and which may project outwardly from the casing or housing of the lamp, the projecting part being closed at its free end by means of a cap. The air passes from the interior of the headlamp to this free end, and then from the latter it passes once again towards the headlamp casing, the passage through which the air flows being brought in communication with the outside in a suitable way.

This known type of ventilation orifice does however have a certain number of drawbacks. First of all it does not perfectly satisfy the requirements mentioned above, in particular when the headlamp is directly exposed to a water jet from a high pressure washing apparatus or the like. This is due, especially, to the particular configuration followed by the ventilation path described above. In addition, the quality of sealing between the cap and the end of the cylindrical projection, which is critical in the avoidance of any penetration of mud, may deteriorate with time. Indeed, the cap may even become completely separated from the casing, and this may lead to substantial penetration of foreign matter into the inside of the headlamp.

DISCUSSION OF THE INVENTION

An object of the present invention is to overcome the above mentioned drawbacks, without significantly increasing the selling price of the headlamp and without increasing its overall size.

According to the invention, therefore, a headlamp, especially but not exclusively for a vehicle such as a motor vehicle, of the type comprising a housing which defines, with a front cover glass, an internal space which is essentially closed, and in which a light source is disposed, together with at least one ventilating means associated with the housing, for ventilation of the internal space, is characterised in that the ventilating means comprises a first projecting portion of the housing, projecting externally of the latter and defining, together with a first cap mounted on the free end of the said first projecting portion, a first duct and a second duct communicating with each other via a bend which is situated in the vicinity of the said free end of the first projecting portion, and a second projecting portion of the housing which projects into the interior of the latter and which defines, together with a second cap mounted on the free end of the second projecting portion, a third duct and a fourth duct, the said third and fourth ducts communicating with each other through a further bend situated in the vicinity of the free end of the second projecting portion, while the first and third ducts also communicate with each other, the second and fourth ducts being open, respectively, essentially downwardly to atmosphere and essentially upwardly into the said internal space of the headlamp.

Further aspects, object and advantages of the present invention will appear more clearly from a reading of the detailed description of a preferred embodiment of the invention, which follows. The description is given by way of an example only and with reference to the accompanying drawings.

DESCRIPTION OF A PREFERRED EMBODIMENT OF THE INVENTION

Figure 1:
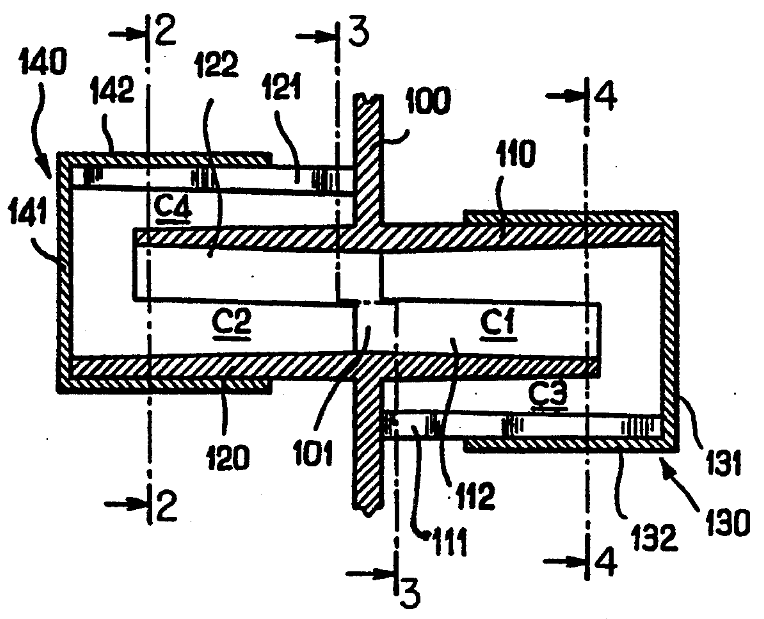
FIG. 1 is a view in vertical axial cross-section showing part of the housing of a headlamp having a ventilation passage.
Figure 2:
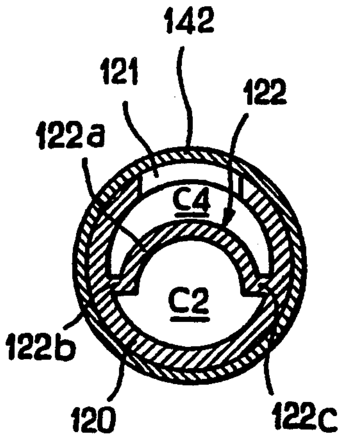
FIG. 2 is a view in transverse cross section taken on the line II—II in FIG. 1.
Figure 3:
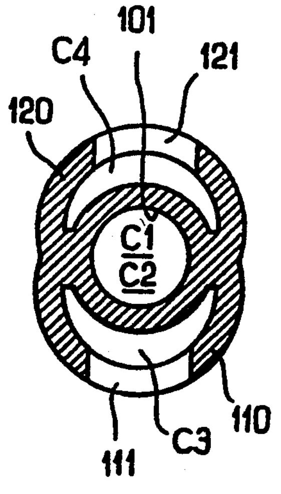
FIG. 3 is a view in transverse cross section taken on the line III—III in FIG. 1.
Figure 4:
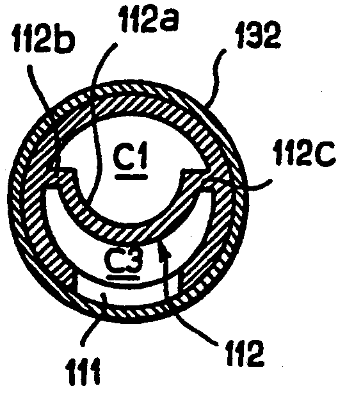
FIG. 4 is a view in transverse cross section taken on the line IV—IV in FIG. 1.
Figure 5:
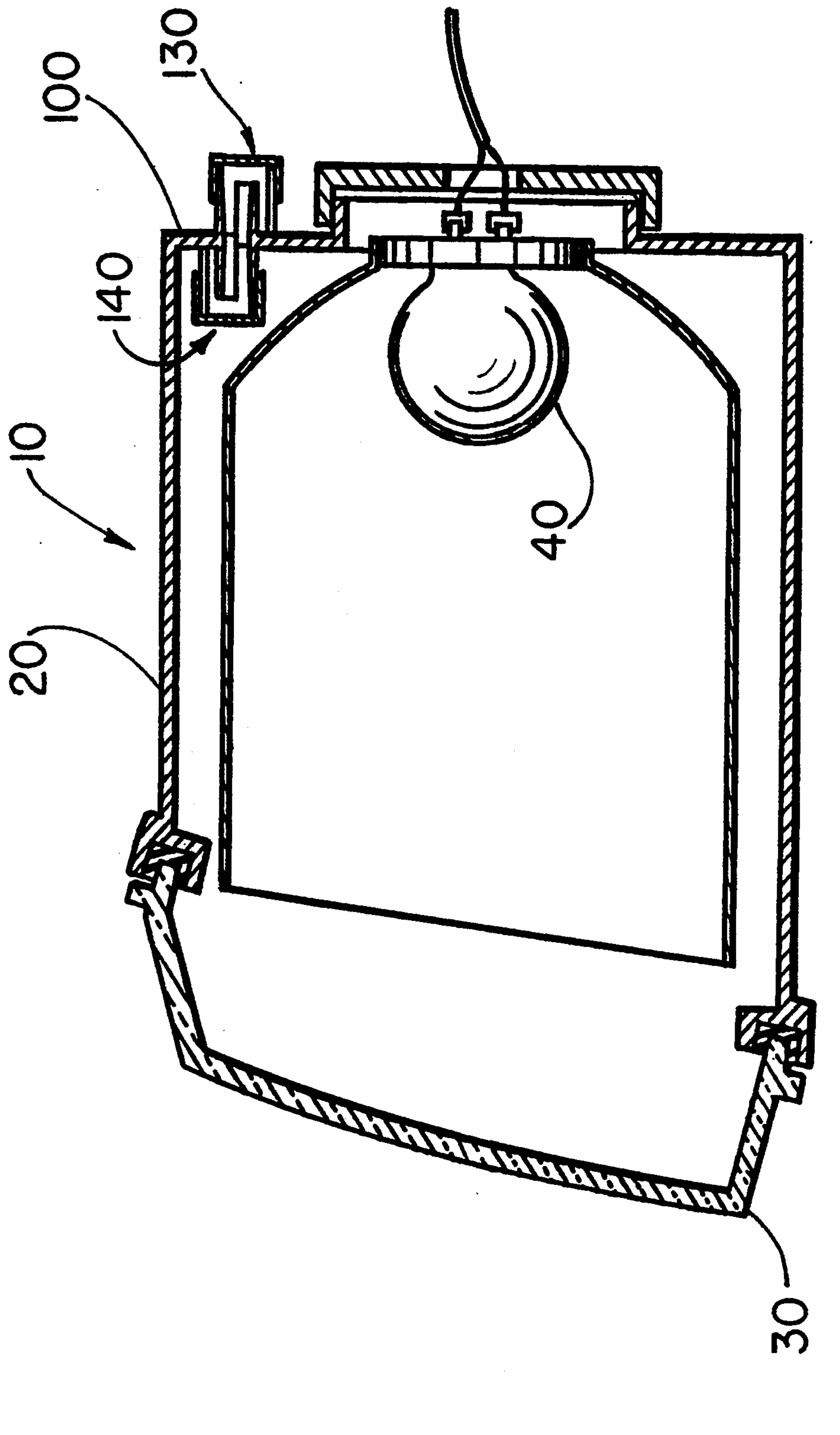
FIG. 5 is a side view of a vehicle headlamp having a ventilation passage.

In the drawings, the reference numeral 10 indicates a headlamp having a headlamp housing 20, a cover glass 30 and a light source 40. The reference numeral 100 indicates a wall, for example, the rear wall, of a headlamp housing. Towards the outside of the housing (i.e. towards the right in FIG. 1) there extends a first projecting portion 110 of this wall. The portion 110 is made for example by moulding with the housing. The contour of the projecting portion 110 is generally cylindrical and defines a horizontal axis.

A second projecting portion 120 extends from the wall 100 towards the interior of the housing (i.e. towards the left in FIG. 1). The portion 120 is again preferably made by moulding, and preferably has a generally cylindrical contour defining a horizontal axis. From here on, it will be noted that the projecting portions 110 and 120 are not coaxial, but that the axis of the inwardly directed projecting portion 120 is located at a higher level than that of the other portion 110. The axial free end of each cylindrical portion 110, 120 is open. Two caps, indicated respectively by the reference numerals 130 and 140, are removably mounted on these free ends, so as to cover the latter. The two caps are preferably strictly identical with each other, notably with the purpose of limiting design costs and manufacturing costs by enabling a single design of component to be used. Each cap includes the conventional circular end panel indicated at 131 and 141 respectively, together with a peripheral collar or skirt, which is oriented essentially axially and which is indicated at 132 and 142 respectively.

The two caps 130 and 140 are held in place by virtue of the resilient gripping force which is exerted by the collars 132, 142 on the outside of the respective projecting portions 110 and 120. The caps 130 and 140 are preferably made of rubber.

The cylindrical portion 110 is formed with a slot 111, which extends over its whole length and in its lower region. The cylindrical portion 120 has a similar slot 121 which is formed longitudinally in its upper region.

A partition wall 112, defining a baffle, extends within the projecting portion 110 from the wall 100, essentially parallel to the axis of the portion 110. The wall 112 terminates at a particular distance from the free end of the projecting portion 110, and has a generally semi-cylindrical shape in its main central portion 112a. The radius of this semi-cylindrical portion is smaller than that of the projecting portion 110, and is arranged to be concave upwards. Two lateral portions 112b and 112c of the partition wall 112, both of which are essentially flat and horizontal, join the semi-cylindrical portion of the latter to the walls of the projecting portion 110 which surrounds it.

Similarly, another partition wall 122, again in the form of a baffle, extends into the projecting portion 120 from the wall 100, up to a certain distance from the free end of the portion 120. The partition wall 122 has a main central portion 122a, which is generally semi-cylindrical in shape and which is, this time, concave downwards, together with two flat and horizontal lateral portions 122b and 122c, which join the semi-cylindrical portion 122a to the wall of the projecting portion 122a that surrounds it.

It will be noticed here that the cross section of the walls of the projecting portions 110 and 120 and their partition walls 112 and 122 diminish going away from the wall 100, the purpose of this being to facilitate stripping of the housing from the mould.

Finally, the wall 100 of the housing includes a circular aperture 101, which is open on one side into a duct C1 delimited by the partition wall 112 and the upper region of the wall of the projecting portion 110. On the other side the aperture 101 is open into a duct C2, which is delimited by the partition wall 122 and the lower region of the wall of the projecting portion 120.

Thus in this embodiment, the path followed by the ventilating air consists in succession of the following: the slot 111; a duct C3 with which the slot 111 is in communication, and which is defined in the internal space of the projecting portion 110, below the partition wall 112 and between the latter and the collar 132 of the cap 130; an upward bend of about 180° between the axial free edge of the partition wall 112 and the cap 130; the duct C1; then the duct C2; a further upward bend of about 180° between the axial free edge of the partition wall 122 and the cap 140; then a further duct C4, which is situated in the internal space of the projecting portion 120 above the partition wall 112, between the latter and the collar 142 of the cap 140; and finally through the slot 121.

In this way, without the overall size of the housing being increased beyond that of a conventional arrangement, a ventilation path is defined which effectively protects the headlamp against any penetration by water, mud or other foreign matter. This is due mainly to the presence of the double upward bends of about 180° each. The selling cost of the headlamp is not significantly increased, since the projecting portions 110 and 120 are preferably made by moulding them integrally with the housing of the headlamp; it is only necessary to provide a second cap, and, as has been seen, this can simply be identical with the first cap.

In addition, in the event of the outermost of the two caps, 130, giving faulty sealing, or becoming detached from the outer cylindrical portion 110, the ventilation system of the headlamp continues to have some effectiveness against penetration of water or mud, due to the upward 180° bend that exists within the inner projecting portion 120.

The invention is of course in no way limited to the embodiment described above and shown in the drawings, and a person skilled in this technical field will be able to apply to it, within the scope of the invention, any variant or modification. In particular, a headlamp can be equipped with one or more ventilating systems of the kind described above, and the shape and dimensions of the various components and parts of components may vary widely from those described and shown.

What is claimed is:

1. A vehicle headlamp comprising a housing defining a front of the housing, a cover glass covering the front of the housing and defining, with the housing, an internal space which is essentially closed, and a light source disposed in the said space, the headlamp further comprising ventilating means, for ventilating the said internal space, and comprising: a first portion of the housing projecting outside the housing and having a free end; a first cap mounted on the free end of the said first projecting portion and defining with the latter a first duct, a second duct, and a bend, which is disposed in the region of the said free end and which brings the said first and second ducts into communication with each other; a second portion of the housing projecting into the housing and having a free end; and a second cap mounted on the said free end of the second projecting portion and defining with the latter a third duct, a fourth duct, and a second bend which is located close to the said free end of the second projecting portion, and which brings the third and fourth duct into communication with each other, the said first and third ducts being in communication with each other, and the second duct being open essentially downwards to atmosphere, with the fourth duct being open essentially upwards into the said internal space.

2. A headlamp according to claim 1, wherein the said housing has a wall defining an aperture through it, the said projecting portions being joined to the said wall and so positioned that the said first and third ducts are essentially aligned and communicate with each other through the said aperture.

3. A headlamp according to claim 1, wherein the said first projecting portion has a lower region defining a slot extending longitudinally in the said lower region, with the said second duct communicating with atmosphere through the said slot.

4. A headlamp according to claim 1, wherein the said second projecting portion has an upper region defining a further slot extending longitudinally in the said upper region, with the fourth duct communicating with the said internal space through the said further slot.

5. A headlamp according to claim 1, further including a partition wall disposed inside each said projecting portion and separating the said ducts within that projecting portion, with each partition wall extending to a terminal end thereof spaced away from the corresponding cap.

6. A headlamp according to claim 5, wherein each cap has a collar portion, with each said collar portion and the partition wall of the associated said projecting portion together defining between them, at least partially, the said second and fourth ducts respectively.

7. A headlamp according to claim 1, wherein the two caps are substantially identical.

8. A headlamp according to claim 1, wherein the said first and second projecting portions are out of alignment with each other, the said second projecting portion being at a higher level than the first.

* * * * *